United States Patent [19]

Ezaki

[11] Patent Number: 5,150,218
[45] Date of Patent: Sep. 22, 1992

[54] VIDEO TPAE RECORDER WITH RECORDING OF A CODE TO IDENTIFY PICTURE ASPECT RATIO

[75] Inventor: Tadashi Ezaki, Kanagawa, Japan
[73] Assignee: Sony Corporation, Tokyo, Japan
[21] Appl. No.: 753,423
[22] Filed: Aug. 30, 1991

[30] Foreign Application Priority Data

Sep. 20, 1990 [JP] Japan .................. 2-250696

[51] Int. Cl.⁵ .............................. H04N 5/78
[52] U.S. Cl. ...................... 358/310; 360/19.1
[58] Field of Search ........... 358/335, 310, 313, 343, 358/12, 180, 341; 360/33.1, 14.2, 19.1

[56] References Cited

U.S. PATENT DOCUMENTS

| | | | |
|---|---|---|---|
| 4,500,930 | 2/1985 | Hamalainen et al. | 358/310 |
| 4,897,722 | 1/1990 | Flory | 358/180 |
| 4,914,527 | 4/1990 | Asai et al. | 358/343 |
| 5,001,551 | 3/1991 | Otto | 358/12 |

Primary Examiner—Donald McElheny, Jr.
Assistant Examiner—Huy Nguyen
Attorney, Agent, or Firm—Alvin Sinderbrand; William S. Frommer

[57] ABSTRACT

An apparatus for recording video and audio signals, in which a magnetic head device is operative to record a unit period segment of a first recording video signal based on a first video signal from which a reproduced picture of a first aspect ratio is properly obtained or a second recording video signal based on a second video signal from which a reproduced picture of a second aspect ratio is properly obtained, a segment of a first digital audio signal based on an audio signal corresponding to the first video signal or a second digital audio signal based on an audio signal corresponding to the second video signal and identifying coce data indicating whether the first or second recording video signal is to be recorded, in respective different portions of a record track formed on a magnetic recording medium.

7 Claims, 7 Drawing Sheets

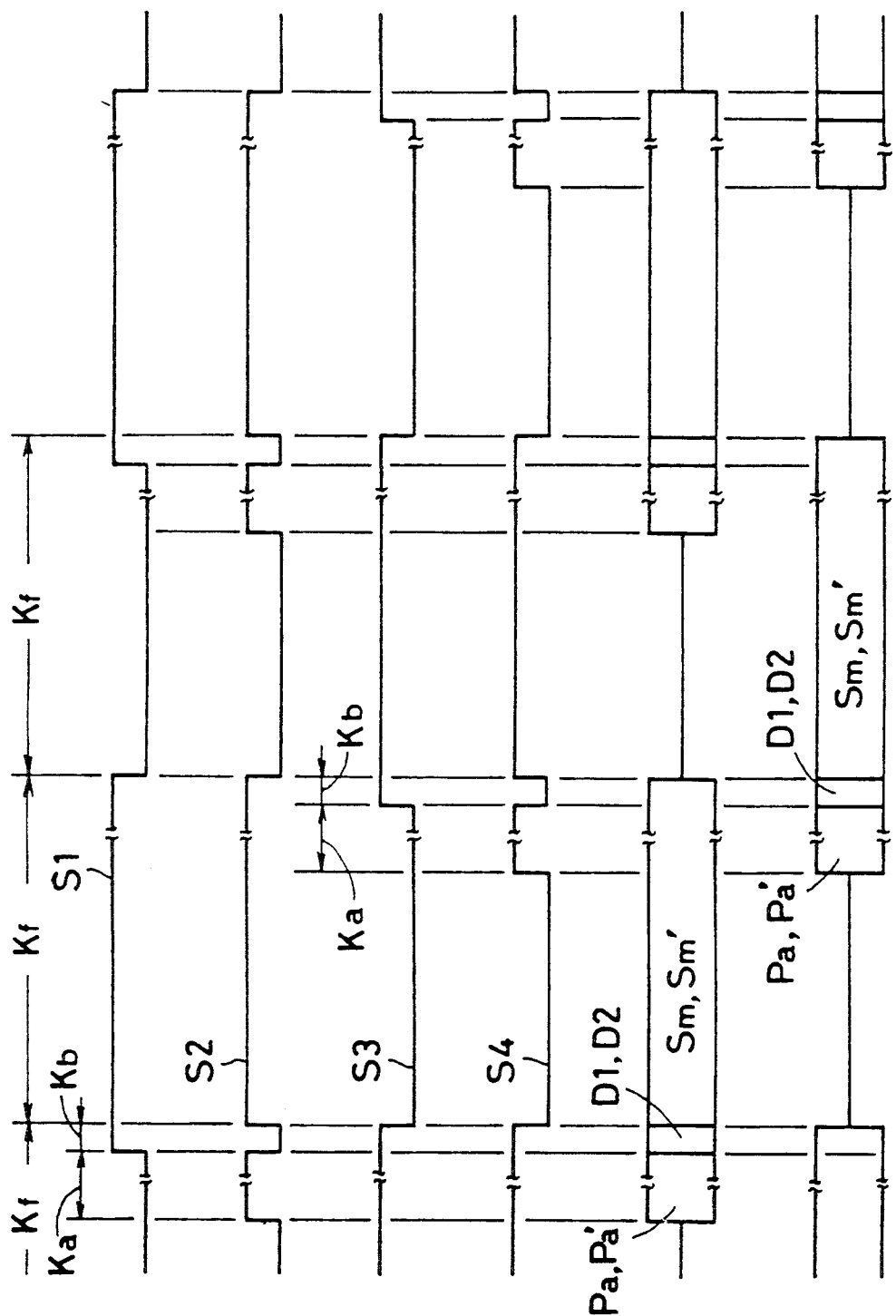

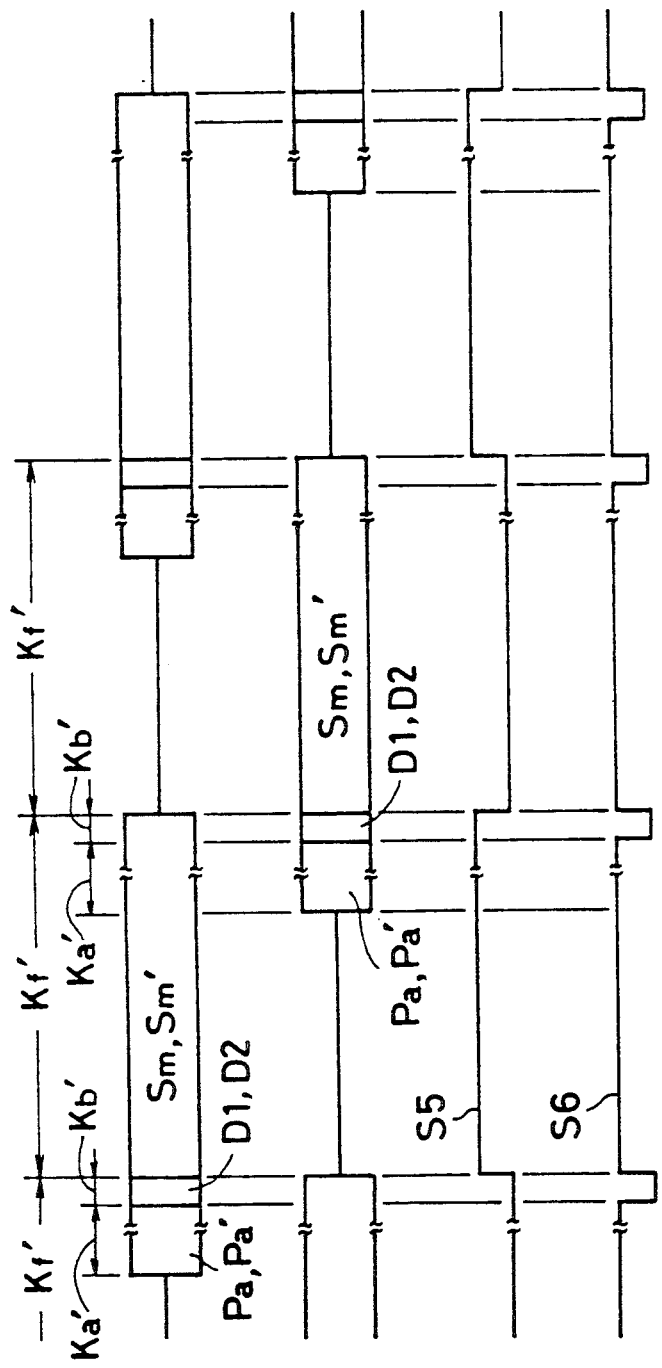

VIDEO TPAE RECORDER WITH RECORDING OF A CODE TO IDENTIFY PICTURE ASPECT RATIO

FIELD OF THE INVENTION

The present invention generally relates to apparatus for recording video and audio signals, and more particularly, to an apparatus for recording through a magnetic head device a unit period segment, such as a field period segment, of a video signal and a segment of a digitalized audio signal corresponding to the unit period segment of the video signal in each of a plurality of record tracks formed in arrangement on a magnetic recording medium.

DESCRIPTION OF THE PRIOR ART

There have been proposed to put a so-called 8 mm-VTR, which is a video tape recorder for recording video and audio signals constituting a television signal on a magnetic tape having its width of 8 mm and for reproducing video and audio signals recorded on the magnetic tape having its width of 8 mm, to practical use. The magnetic tape which has been subjected to signal recording by the 8 mm-VTR is provided thereon with a plurality of slant record tracks formed in arrangement in a direction along which the magnetic tape extends, and each of the slant record tracks has a first portion in which a digital audio signal processed in accordance with pulse code modulation (hereinafter, referred to as a PCM audio signal) has been recorded, a second portion which is separated from the first portion to occupy a large part of the slant record track and in which a recording video signal has been recorded in the form of an analog signal and a third portion which is allocated between the first and second portions and in which code data representing various kinds of information have been recorded.

In such signal recording, a unit period segment, such as a field period segment, of the recording video signal and a segment of the PCM audio signal corresponding to the unit period segment of the recording video signal are recorded in the second and first portions of each slant record track, respectively. The third portion of each slant record track is named a V-P guard and the code data recorded in the V-P guard are referred to as video-markers. Incidentally, the signal recording in which the PCM audio signal and the recording video signal are respectively recorded in separate portions of a common record track formed on a magnetic tape has been disclosed in, for example, Japanese patent application published before examination under the publication number 58-199409.

In the 8 mm-VTR by which the PCM audio signal, the recording video signal and the video-markers are recorded in each of the slant record tracks formed on the magnetic tape in such a manner as described above, the magnetic tape is wrapped on the surface of a rotary head cylinder over an angular extent of, for example, 221 degrees to run along the surface of the rotary head cylinder and scanned alternately by a pair of rotary magnetic heads disposed at an angular interval of 180 degrees in the rotary head cylinder to rotate together with the rotary head cylinder. The first portion for the PCM audio signal and the V-P guard for the video-markers of each of the slant record tracks are formed successively during a period of time in which each rotary magnetic head scans the magnetic tape moving along the surface of the rotary head cylinder in an angular extent of about 30 degrees at the beginning of its scanning and the second portion for the recording video signal of each of the slant record tracks is formed to extend from the V-P guard during another period of time in which each rotary magnetic head scans the magnetic tape moving along the surface of the rotary head cylinder in an angular extent of 180 degrees after the beginning of its scanning.

The recording video signal thus recorded in each of the slant record tracks formed on the magnetic tape is composed of a frequency-modulated luminance signal (hereinafter, referred to as an FM luminance signal) which is obtained based on a luminance signal constituting a color television signal and a down-converted chrominance signal which is obtained by frequency-converting a chrominance signal constituting, together with the luminance signal, the color television signal into a lower frequency band, both of which are combined by frequency-multiplexing. Accordingly, when a reproduced video signal is obtained by a reproducing system from the magnetic tape on which the recording video signal is recorded in each of the slant record tracks, the FM luminance signal and the down-converted chrominance signal which are read from the magnetic tape by rotary magnetic heads for reproduction and then separated from each other are respectively subjected to frequency-demodulation and frequency-conversion to produce reproduced luminance and chrominance signals.

The PCM audio signal recorded, together with the recording video signal, in each of the slant record tracks formed on the magnetic tape is formed by adding an error correcting code to a digitalized audio signal converted from an input analog audio signal, causing the digitalized audio signal added thereto the error correcting code to be subjected to time-base compression, and then encoding the time-base compressed digitalized audio signal. Accordingly, when a reproduced audio signal is obtained by the reproducing system from the magnetic tape on which the PCM audio signal is recorded, together with the video signal, in each of the slant record tracks, the PCM audio signal which is read from the magnetic tape by the rotary magnetic heads for reproduction is decoded and subjected to time-base expansion and error correction, and then converted into an analog signal to produce a reproduced analog audio signal.

In the signal recording wherein the recording video signal composed of the FM luminance signal and the down-converted chrominance signal, the PCM audio signal and the video-markers are recorded in each of the slant record tracks formed on the magnetic tape as described above, it is usual previously that a video signal from which a reproduced picture of the aspect ratio of 3:4 is obtained (hereinafter, referred to as a video signal of 3:4 aspect ratio) is used as an input video signal containing the luminance signal from which the FM luminance signal is formed and the chrominance signal from which the down-converted chrominance signal is formed. However, with diversification in the use of reproduced pictures based on the television signal, there has been also proposed an improved television system in which a reproduced picture has an aspect ratio of 9:16, as shown with a dot-dash line in FIG. 1, which is horizontally enlarged compared with a reproduced picture of aspect ratio of 3:4, as shown with a solid line in FIG. 1, and with development of such an improved television system, it is not unusual that a video signal from which a reproduced picture of the aspect ration of 9:16 is obtained (hereinafter, referred to as a video signal of 9:16 aspect ratio) is applied to the signal recording wherein the recording video signal composed of the FM luminance signal and the down-converted chrominance signal, the PCM audio signal and the video-markers are recorded in each of the slant record tracks formed on the magnetic tape.

The video signal of 9:16 aspect ratio has increased information in the horizontal direction and increased high frequency components compared with the video signal of 3:4 aspect ratio so as to have an enlarged occupied frequency bandwidth. Therefore, the recording video signal composed of the FM luminance signal and the down-converted chrominance signal each based on the video signal of 9:16 aspect ratio has an occupied frequency bandwidth enlarged toward a high frequency range compared with the recording video signal composed of the FM luminance signal and the down-converted chrominance signal each based on the video signal of 3:4 aspect ratio.

Under the above situation, in the case where a first signal recording condition in which the recording video signal composed of the FM luminance signal and the down-converted chrominance signal each based on the video signal of 3:4 aspect ratio, the PCM audio signal and the video-markers are recorded in each of the slant record tracks formed on the magnetic tape, and a second signal recording condition in which the recording video signal composed of the FM luminance signal and the down-converted chrominance signal each based on the video signal of 9:16 aspect ratio, the PCM audio signal and the video-markers are recorded in each of the slant record tracks formed on the magnetic tape, can be alternatively selected, any specific information indicating that the recording video signal recorded on the magnetic tape is based on the video signal of 3:4 aspect ratio or the recording video signal recorded on the magnetic tape is based on the video signal of 9:16 aspect ratio is not recorded on the magnetic tape. Therefore, when the magnetic tape on which the recording video signal composed of the FM luminance signal and the down-converted chrominance signal, the PCM audio signal and the video-markers are recorded in the first or second signal recording condition is subjected to signal reproduction, it is possible that the FM luminance signal and the down-converted chrominance signal each based on the video signal of 9:16 aspect ratio are read from the magnetic tape and processed through a reproducing system which is arranged to process properly the FM luminance signal and the down-converted chrominance signal each based on the video signal of 3:4 aspect ratio for reproducing the video signal of 3:4 aspect ratio or the FM luminance signal and the down-converted chrominance signal each based on the video signal of 3:4 aspect ratio are read from the magnetic tape and processed through a reproducing system which is arranged to process properly the FM luminance signal and the down-converted chrominance signal each based on the video signal of 9:16 aspect ratio for reproducing the video signal of 9:16 aspect ratio, and as a result, a correct reproduced video signal of 3:4 aspect ratio or a correct reproduced video signal of 9:16 aspect ratio can not be obtained.

OBJECTS AND SUMMARY OF THE INVENTION

Accordingly, it is an object of the present invention to provide an apparatus for recording video and audio signals, which avoids the foregoing problems encountered with the prior art.

Another object of the present invention is to provide an apparatus for recording video and audio signals, by which a unit period segment of a recording video signal based on an input video signal, a segment of a digital audio signal based on an audio signal accompanying the input video signal, which corresponds to the unit period segment of the recording video signal, and code data representing various kinds of information are respectively recorded in different portions of each of a plurality of record tracks formed on a magnetic recording medium in such a manner that it can be easily checked whether the recording video signal recorded on the magnetic tape is based on a video signal from which a reproduced picture of a first aspect ratio of, for example, 3:4 is properly obtained or based on a video signal from which a reproduced picture of a second aspect ratio of, for example, 9:16 is properly obtained when the magnetic recording medium is subjected to signal reproduction therefrom.

According to the present invention, there is provided an apparatus for recording video and audio signals, which comprises a recording video signal producing portion for generating selectively a first recording video signal based on a video signal from which a reproduced picture of a first aspect ratio is properly obtained and a second recording video signal based on a video signal from which a reproduced picture of a second aspect ratio is properly obtained, a digital audio signal producing portion for generating selectively a first digital audio signal based on an audio signal corresponding to the video signal from which the reproduced picture of the first aspect ratio is properly obtained and a second digital audio signal based on an audio signal corresponding to the video signal from which the reproduced picture of the second aspect ratio is properly obtained, a code data producing portion for generating identifying code data indicating whether the first recording video signal or the second recording video signal is obtained from the recording video signal producing portion, a magnetic head device operative to scan a magnetic recording medium for forming a plurality of record tracks arranged successively on the magnetic recording medium, and a signal supply controlling portion for supplying the magnetic head device with the first or second recording video signal obtained from the recording video signal producing portion, the first or second digital audio signal obtained from the digital audio signal producing portion and the identifying code data obtained from the code data producing portion in such a manner that a unit period segment of the first or second recording video signal, a segment of the first or second digital audio signal corresponding to the unit period segment of the first or second recording video signal and the identifying code data are recorded in respective different portions of the record track.

With the apparatus thus constituted in accordance with the present invention, under the control by the signal supply controlling device, the identifying code data are recorded in the record track to indicate either one a first condition in which the identifying code data are accompanied with the unit period segment of the first recording video signal and the segment of the first digital audio signal or a second condition in which the identifying code data are accompanied with the unit period segment of the second recording video signal and the segment of the second digital audio signal. As a result, information representing whether the recording video signal recorded on the magnetic recording medium is based on the first video signal from which the reproduced picture of the first aspect ratio, such as 3:4, is properly obtained or based on the second video signal from which the reproduced picture of the second aspect ratio, such as 9:16, is properly obtained, is recorded in the form of code data on the magnetic recording medium which has been subjected to the signal recording by the apparatus according to the present invention, and consequently it can be easily checked whether the recording video signal recorded on the magnetic recording medium is based on the video signal from which the reproduced picture of the first aspect ratio of, for example, 3:4 is properly obtained or based on the video signal from which the reproduced picture of the second aspect ratio of, for example, 9:16 is properly obtained when the magnetic record medium is subjected to signal reproduction therefrom.

Further, since the identifying code data are recorded in the portion of the record track separated from the portions of the record track in which the unit period segment of the recording video signal and the segment of the digital audio signal are recorded, respectively, the identifying code data in the record track do not exert any undesirous influence upon each of the unit period segment of the recording video signal and the segment of the digital audio signal.

The above, and other objects, features and advantages of the present invention will become apparent from the following detailed description which is to be read in conjunction with the accompanying drawings.

BRIEF DESCRIPTION OF THE DRAWINGS

FIGS. 5A to 5F are time charts used for explanation of the operation of the embodiment shown in FIG. 2;

FIGS. 10A to 10D are time charts used for explanation of the operation of the reproducing system shown in FIG. 9.

DESCRIPTION OF THE PREFERRED EMBODIMENT

Figure 2:
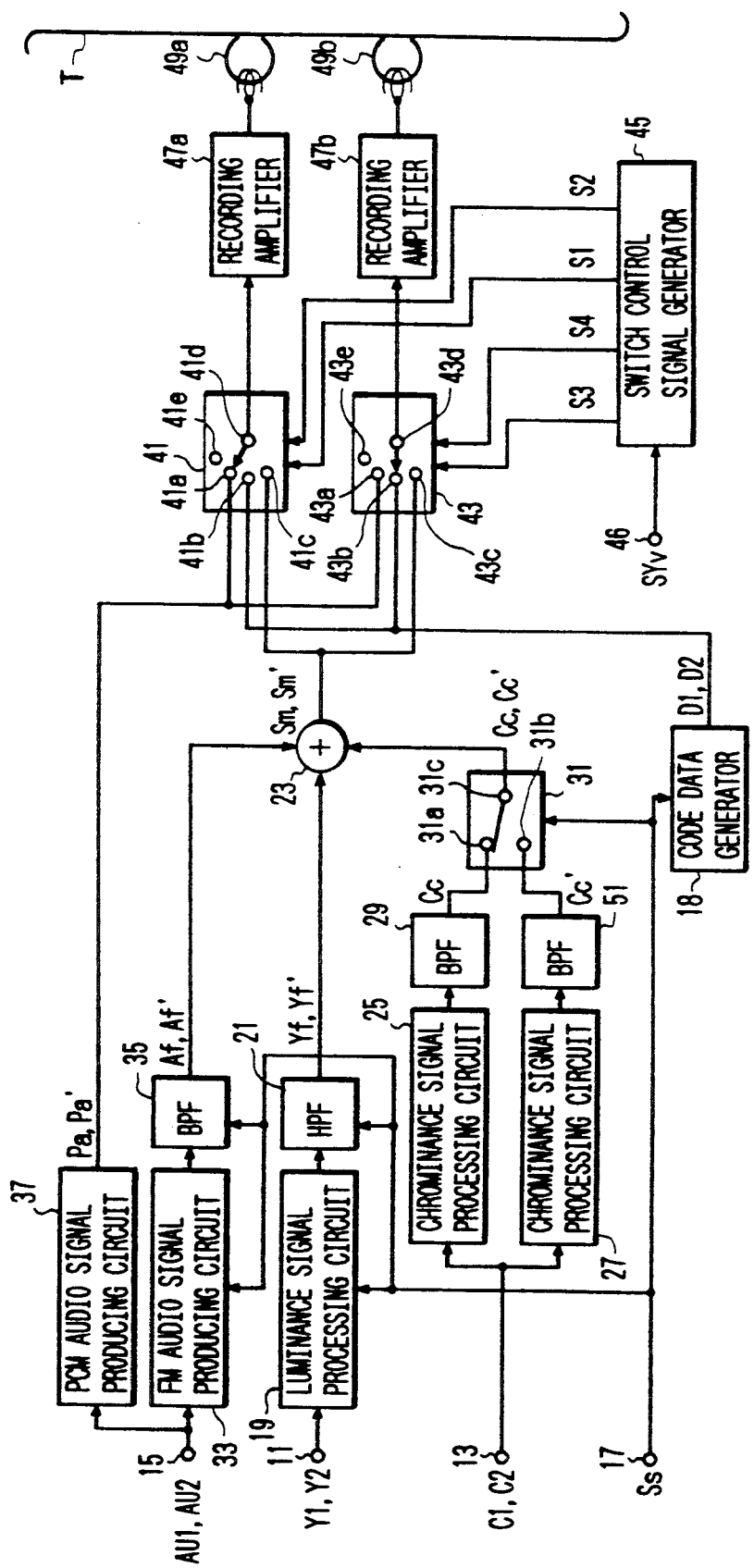
FIG. 2 is a schematic block diagram showing an embodiment of apparatus for recording video and audio signals according to the present invention.

FIG. 2 shows an embodiment of apparatus for recording video and audio signals according to the present invention.

Referring to FIG. 2, a first luminance signal Y1 and a first chrominance signal C1 constituting a video signal of 3:4 aspect ratio or a second luminance signal Y2 and a second chrominance signal C2 constituting a video signal of 9:16 aspect ratio are supplied to a pair of video signal input terminals 11 and 13, respectively.

A first audio signal AU1 accompanying the video signal of 3:4 aspect ratio constituted with the first luminance signal Y1 and the first chrominance signal C1 or a second audio signal AU2 accompanying the video signal of 9:16 aspect ratio constituted with the second luminance signal Y2 and the second chrominance signal C2 is supplied to an audio signal input terminal 15.

Further, an aspect ratio indicating signal Ss which has a low level when the first luminance signal Y1 and the first chrominance signal C1 constituting the video signal of 3:4 aspect ratio are supplied to the video signal input terminals 11 and 13, respectively, and a high level when the second luminance signal Y2 and the second chrominance signal C2 constituting the video signal of 9:16 aspect ratio are supplied to the video signal input terminals 11 and 13, respectively, is supplied to a control signal input terminal 17.

Figure 1:
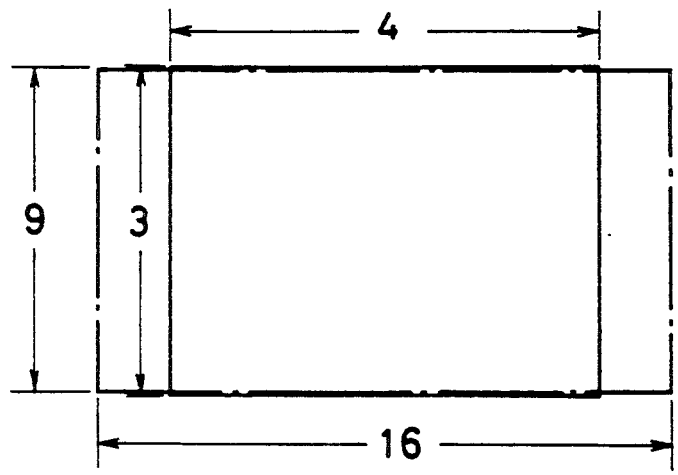
FIG. 1 is an illustration used for explanation of aspect ratios of reproduced pictures.
Figure 3:
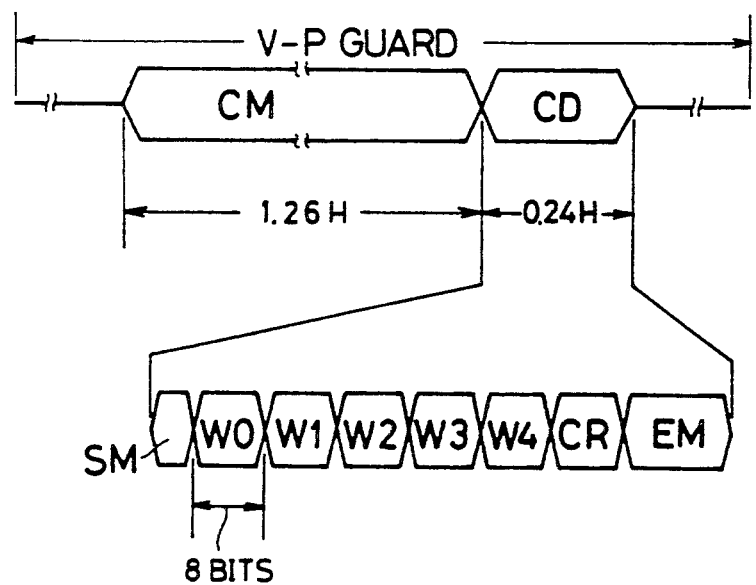
FIG. 3 is an illustration used for explanation of a V-P guard formed in a record track.

The aspect ratio indicating signal Ss is then supplied from the control signal input terminal 17 to a code data generator 18. The code data generator 18 is operative to supply code data serving as video-markers which includes a search marker portion CM corresponding to $1.26 \times H$ (H represents a line period of the first or second luminance signal) and a coding data portion CD corresponding to $0.24 \times H$ and following the search marker portion CM, as shown in FIG. 3. The search marker portion CM comprises data bits representing "0" or "1" in the aggregate. The coding data portion CD comprises a start marker SM, five data words W0, W1, W2, W3 and W4 each composed of eight bits, an error detecting word CR and an end marker EM.

The code data generator 18 forms, in response to the aspect ratio indicating signal Ss supplied thereto, the video-markers to include selectively first identifying code data which are constituted by a part of five data words W0 to W4 to indicate a first condition in which the first luminance signal Y1 and the first chrominance signal C1 constituting the video signal of 3:4 aspect ratio are supplied to the video signal input terminals 11 and 13, respectively, and second identifying code data which are also constituted by a part of five data words W0 to W4 to indicate a second condition in which the second luminance signal Y2 and the second chrominance signal C2 constituting the video signal of 9:16 aspect ratio are supplied to the video signal input terminals 11 and 13, respectively. To be concrete, the video-markers are formed to contain the first identifying code data which are constituted by a part of five data words W0 to W4 to indicate the first condition in which the first luminance signal Y1 and the first chrominance signal C1 constituting the video signal of 3:4 aspect ratio are supplied to the video signal input terminals 11 and 13, respectively, when the aspect ratio indicating signal Ss has the low level and also formed to contain the second identifying code data which are constituted by a part of five data words W0 to W4 to indicate the second condition in which the second luminance signal Y2 and the second chrominance signal C2 constituting the video signal of 9:16 aspect ratio are supplied to the video signal input terminals 11 and 13, respectively, when the aspect ratio indicating signal Ss has the high level. Then, the video-markers containing the first identifying code data are derived from the code data generator 18 as first code data D1 and the video-markers containing the second identifying code data are derived from the code data generator 18 as second code data D2.

When the first luminance signal Y1 and the first chrominance signal C1 constituting the video signal of 3:4 aspect ratio are supplied to the video signal input terminals 11 and 13, respectively, the first luminance signal Y1 is supplied from the video signal input terminal 11 to a luminance signal processing circuit 19. The luminance signal processing circuit 19 is also supplied with the aspect ratio indicating signal Ss having the low level and, in response thereto, operative to produce an FM luminance signal Yf based on the first luminance signal Y1. The FM luminance signal Yf is formed to have a frequency band of carrier frequency deviations so defined that the top of the synchronous signal of the first luminance signal Y1 corresponds to frequency Fs which is, for example, 5.7 MHz and the white peak of the first luminance signal Y1 corresponds to frequency Fp which is, for example, 7.7 MHz, and derived from the luminance signal processing circuit 19 through a high pass filter (HPF) 21, a cutoff frequency of which is set to be approximately 2 MHz in response to the aspect ratio indicating signal Ss having the low level and supplied thereto, to be supplied to a signal mixing circuit 23.

The first chrominance signal C1 is supplied from the video signal input terminal 13 to both of chrominance signal processing circuits 25 and 27. The chrominance signal processing circuit 25 produces a down-converted chrominance signal Cc having a subcarrier frequency Fc which is, for example, about 743 KHz based on the first chrominance signal C1. The down-converted chrominance signal Cc is derived from the chrominance signal processing circuit 25 through a band pass filter (BPF) 29 to be supplied to a selective contact 31a of a switch 31. The switch 31 is controlled by the aspect ratio indicating signal Ss having the low level and supplied thereto to cause a movable contact 31c to engage the selective contact 31a and therefore the down-converted chrominance signal Cc from the BPF 29 is supplied through the switch 31 to the signal mixing circuit 23.

The FM luminance signal Yf supplied from the HPF 21 to the signal mixing circuit 23 and the down-converted chrominance signal Cc supplied from the BPF 29 to the signal mixing circuit 23 constitute a first recording video signal.

Under such a condition, the first audio signal AU1 accompanying the video signal of 3:4 aspect ratio is supplied from the audio signal input terminal 15 to a FM audio signal producing circuit 33. The FM audio signal producing circuit 33 is also supplied with the aspect ratio indicating signal Ss having the low level and, in response thereto, operative to produce a first frequency-modulated audio signal (hereinafter, referred to as a first FM audio signal) Af based on the first audio signal AU1.

The first FM audio signal Af is formed to have a carrier frequency Fa which is, for example, 1.5 MHz and a frequency band of carrier frequency deviations of about ±(100 to 150) KHz and derived from the FM audio signal producing circuit 33 through a BPF 35, a central frequency of the pass band of which is set to be approximately 1.5 MHz in response to the aspect ratio indicating signal Ss having the low level and supplied thereto, to be supplied to the signal mixing circuit 23.

Figure 4:
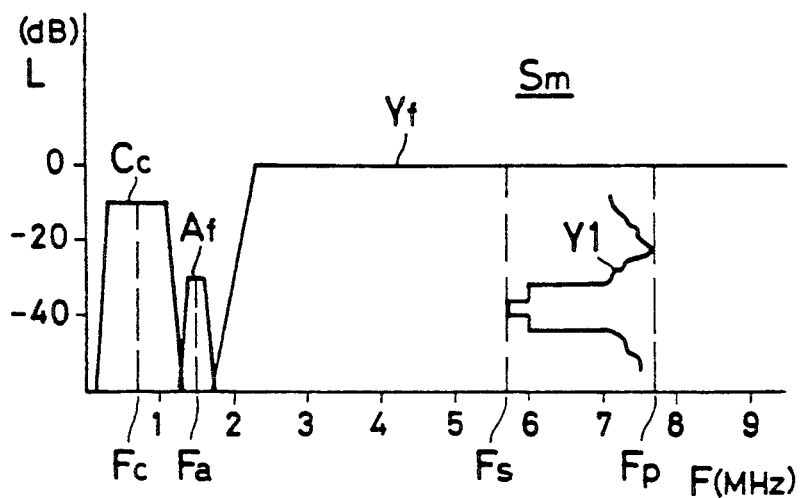
FIG. 4 is a frequency spectrum used for explanation of a video signal recorded on a magnetic tape.

In the signal mixing circuit 23, the FM luminance signal Yf from the HPF 21, the down-converted chrominance signal Cc from the switch 31, and the first FM audio signal Af from the BPF 35 are combined by frequency-multiplexing to produce a first composite recording signal Sm. As shown in the frequency spectrum of FIG. 4, which has abscissas representing frequency F and ordinates representing level L, the first composite recording signal Sm includes the FM luminance signal Yf having frequency-deviations between the frequency Fs and the frequency Fp, the down-converted chrominance signal Cc having the subcarrier frequency Fc and allocated a frequency band lower than the frequency band of the FM luminance signal Yf, and the first FM audio signal Af having the center frequency Fa and allocated in a relatively narrow space between the frequency band of the down-converted chrominance signal Cc and the frequency band of the FM luminance signal Yf.

The first audio signal AU1 from the audio signal input terminal 15 is further supplied to a PCM audio signal producing circuit 37. In the PCM audio signal producing circuit 37, the first audio signal AU1 is subjected to analog to digital conversion (A/D conversion), coding with error correcting code added thereto, time-base compression and modulation to produce a first PCM audio signal Pa as a digital audio signal formed based on the first audio signal AU1.

Further, the first code data D1 which are formed, in response to the aspect ratio indicating signal Ss having the low level, to contain the first identifying code data which indicates the first condition in which the first luminance signal Y1 and the first chrominance signal C1 constituting the video signal of 3:4 aspect ratio are supplied to the video signal input terminals 11 and 13, respectively, and therefore the FM luminance signal Yf and the down-converted chrominance signal Cc constituting the first recording video signal are obtained from the HPF 21 and the switch 31, respectively, is derived from the code data generator 18.

The first composite recording signal Sm obtained from the signal mixing circuit 23 is supplied to both of a selective contact 41c of a switch 41 and a selective contact 43c of a switch 43, the first code data D1 obtained from the code data generator 18 is supplied to both of a selective contact 41b of the switch 41 and a selective contact 43b of the switch 43, and the first PCM audio signal Pa obtained from the PCM audio signal producing circuit 37 is supplied to both of a selective contact 41a of the switch 41 and a selective contact 43a of the switch 43. The switch 41 is controlled in operation by switch control signals S1 and S2 obtained from a switch control signal generator 45, and the switch 43 is controlled in operation by switch control signals S3 and S4 obtained from the switch control signal generator 45. The switch control signal generator 45 is operative to send out the switch control signals S1 to S4 in synchronism with a vertical synchronous signal SYv which is separated from the first luminance signal Y1 and supplied to a terminal 46 provided to the switch control signal generator 45. Each of the switch control signals S1 to S4 has low and high levels selectively with a period corresponding to a period of time twice as long as a field period Kf of the first luminance signal Y1, and the level variations in the switch control signals S1 to S4 are shown in FIGS. 5A, 5B, 5C and 5D, rspectively.

The switch 41 is controlled to cause the movable contact 41d to engage a selective contact 41e when each of the switch control signals S1 and S2 has the low level, to engage the selective contact 41a when the switch control signal S1 has the low level and the switch control signal S2 has the high level, to engage the selective contact 41b when the switch control signal S1 has the high level and the switch control signal S2 has the low level, and to engage the selective contact 41c when each of the switch control signals S1 and S2 has the high level. Similarly, the switch 43 is controlled to cause the movable contact 43d to engage a selective contact 43e when each of the switch control signals S3 and S4 has the low level, to engage the selective contact 43a when the switch control signal S3 has the low level and the switch control signal S4 has the high level, to engage the selective contact 43b when the switch control signal S3 has the high level and the switch control signal S4 has the low level, and to engage the selective contact 43c when each of the switch control signals S3 and S4 has the high level.

With the control by each of the switch control signals S1 and S2 as mentioned above, the switch 41 extracts, through the movable contact 41d, the first PCM audio signal Pa during a period of time Ka close to the end of first every other field period Kf, then the first code data D1 during a short period of time Kb immediately before the end of the first every other field period Kf, and thereafter the first composite recording signal Sm during second every other field period Kf following the first every other field period Kf, as shown in FIG. 5E, and the switch 43 extracts, through the movable contact 43d, the first PCM audio signal Pa during a period of time Ka close to the end of the second every other field period Kf, then the first code data D1 during a short period of time Kb immediately before the end of the second every other field period Kf, and thereafter the first composite recording signal Sm during the first every other field period Kf following the second every other field period Kf, as shown in FIG. 5F. The period of time Kb is selected to correspond to, for example, 6×H, and the code data generator 18 supplies the each of the switches 41 and 43 with the first code data D1 corresponding to, for example, 1.5×H in the aggregate during each of the periods of time Kb.

The first PCM audio signal Pa, the first code data D1 and the first composite recording signal Sm obtained successively and repeatedly from the switch 41 is supplied through a recording amplifier 47a to a rotary magnetic head 49a, and the first PCM audio signal Pa, the first code data D1 and the first composite recording signal Sm obtained successively and repeatedly from the switch 43 is supplied through a recording amplifier 47b to a rotary magnetic head 49b.

Figure 6:
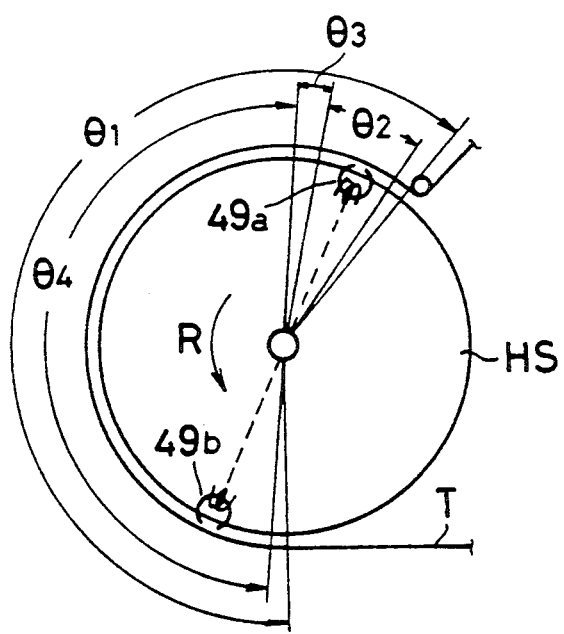
FIG. 6 is a schematic illustration used for explanation of the recording operation of the embodiment shown in FIG. 2.
Figure 7:
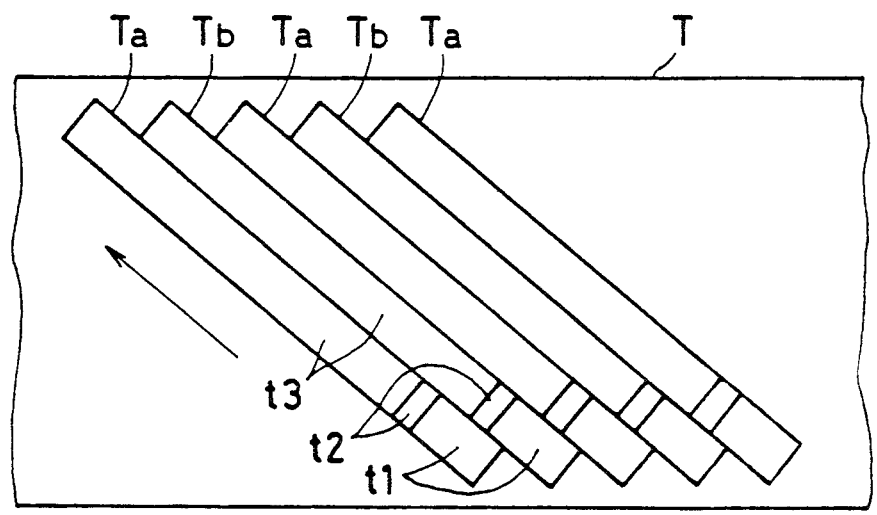
FIG. 7 is a schematic illustration showing an example of recording pattern on a magnetic tape having been subjected to signal recording by the embodiment shown in FIG. 2.

As shown in FIG. 6, the rotary magnetic heads 49a and 49b are disposed at an angular interval of 180 degrees and rotated in a direction of an arrow R to scan alternately a magnetic tape T which is wrapped on the surface of a rotary head cylinder HS over an angular extent $\theta_1$ selected to be, for example, 221 degrees to move along the surface of the rotary head cylinder HS. In each scanning by each of the rotary magnetic heads 49a and 49b, the first PCM audio signal Pa is recorded on the magnetic tape T during a first period of time in which the rotary magnetic head 49a or 49b comes into contact with the magnetic tape T in an angular extent $\theta_2$ corresponding to the aforementioned period of time Ka at the beginning of its scanning on the magnetic tape T, then the first code data D1 are recorded on the magnetic tape T during a second period of time in which the rotary magnetic head 49a or 49b comes into contact with the magnetic tape T in an angular extent $\theta_3$ following the angular extent $\theta_2$ and corresponding to the aforementioned period of time Kb, and thereafter the first composite record signal Sm is recorded on the magnetic tape T during a third period of time in which the rotary magnetic head 49a or 49b comes into contact with the magnetic tape T in an angular extent $\theta_4$ corresponding to the aforementioned field period Kf. As a result, record tracks Ta formed to be inclined to a direction along which the magnetic tape T extends by the rotary magnetic head 49a and record tracks Tb formed to be inclined to the direction along which the magnetic tape T extends by the rotary magnetic head 49b are alternately arranged on the magnetic tape T, as shown in FIG. 7 in which an arrow indicates a direction along which each of the rotary magnetic heads 49a and 49b moves. Each of the record tracks Ta and Tb has a portion t1 which extends from the beginning end thereof to correspond to the angular extent $\theta_2$ and in which the first PCM audio signal Pa is recorded, a portion t2 which follows the portion t1 to correspond to the angular extent $\theta_3$ and in which the first code data D1 are recorded, and a portion t3 which follows the portion t2 to correspond to the angular extent $\theta_4$ and in which the first composite recording signal Sm is recorded. Consequently, in each of the record tracks Ta and Tb, a unit period segment of the first composite recording signal Sm which includes a field period segment of the first recording video signal and a segment of the first FM audio signal Af corresponding to the field period segment of the first recording video signal, a segment of the first PCM audio signal Pa which corresponds to the unit period segment of the first composite recording signal Sm, and the first code data D1 constituting a unit of the video-markers as shown in FIG. 3 are recorded in the portions t1, t2 and t3, respectively.

When the second luminance signal Y2 and the second chrominance signal C2 constituting the video signal of 9:16 aspect ratio are supplied to the video signal input terminals 11 and 13, respectively, the second luminance signal Y2 is supplied from the video signal input terminal 11 to the luminance signal processing circuit 19. The luminance signal processing circuit 19 is also supplied with the aspect ratio indicating signal Ss having the high level and, in response thereto, operative to produce an FM luminance signal Yf' based on the second luminance signal Y2. The FM luminance signal Yf' is formed to have a frequency band of carrier frequency deviations so defined that the top of the synchronous signal of the second luminance signal Y2 corresponds to frequency Fs' which is, for example, 7.7 MHz and the white peak of the second luminance signal Y2 corresponds to frequency Fp' which is, for example, 9.7 MHz, and derived from the luminance signal processing circuit 19 through the HPF 21, the cutoff frequency of which is set to be approximately 3.3 MHz in response to the aspect ratio indicating signal Ss having the high level and supplied thereto, to be supplied to the signal mixing circuit 23.

The second chrominance signal C2 is supplied from the video signal input terminal 13 to both of the chrominance signal processing circuits 25 and 27. The chrominance signal processing circuit 27 produces a down-converted chrominance signal Cc' having a subcarrier frequency Fc' which is, for example, about 1.25 MHz based on the second chrominance signal C2. The down-converted chrominance signal Cc' is derived from the chrominance signal processing circuit 27 through a BPF 51 to be supplied to a selective contact 31b of the switch 31. The switch 31 is controlled by the aspect ratio indicating signal Ss having the high level and supplied thereto to cause the movable contact 31c to engage the selective contact 31b and therefore the down-converted chrominance signal Cc' from the BPF 51 is supplied through the switch 31 to the signal mixing circuit 23.

The FM luminance signal Yf' supplied from the HPF 21 to the signal mixing circuit 23 and the down-converted chrominance signal Cc' supplied from the BPF 51 to the signal mixing circuit 23 constitute a second recording video signal.

Under such a condition, the second audio signal AU2 accompanying the video signal of 9:16 aspect ratio is supplied from the audio signal input terminal 15 to the FM audio signal producing circuit 33. The FM audio signal producing circuit 33 is also supplied with the aspect ratio indicating signal Ss having the high level and, in response thereto, operative to produce a second frequency-modulated audio signal (hereinafter, referred to as a second FM audio signal) Af' based on the second audio signal AU2.

The second FM audio signal Af' is formed to have a carrier frequency Fa' which is, for example, 2.4 MHz and a frequency band of carrier frequency deviations of about ±(100 to 150) KHz and derived from the FM audio signal producing circuit 33 through the BPF 35, the central frequency of the pass band of which is set to be approximately 2.4 MHz in response to the aspect ratio indicating signal Ss having the high level and supplied thereto, to be supplied to the signal mixing circuit 23.

Figure 8:
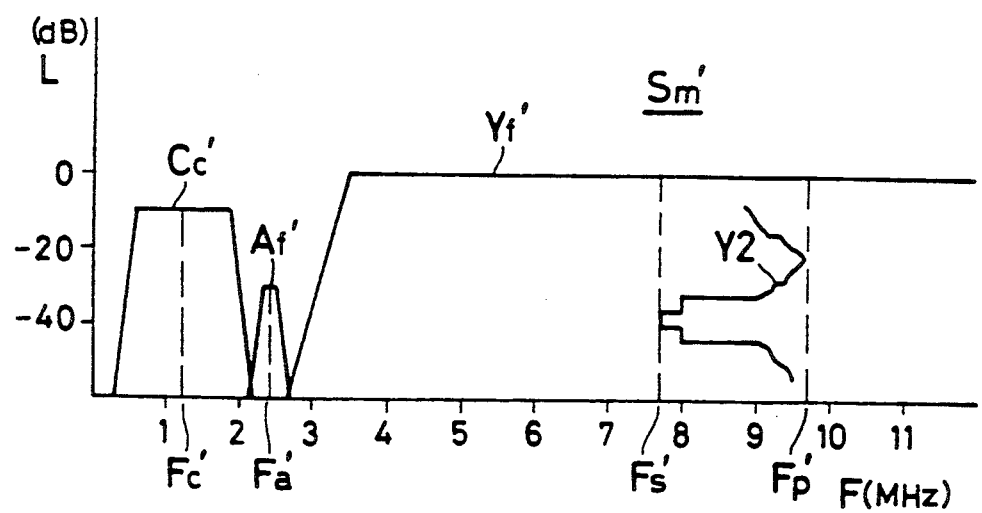
FIG. 8 is a frequency spectrum used for explanation of a video signal recorded on a magnetic tape.

In the signal mixing circuit 23, the FM luminance signal Yf' from the HPF 21, the down-converted chrominance signal Cc' from the switch 31, and the second FM audio signal Af' from the BPF 35 are combined by frequency-multiplexing to produce a second composite recording signal Sm'. As shown in the frequency spectrum of FIG. 8, which has abscissas representing frequency F and ordinates representing level L, the second composite recording signal Sm' includes the FM luminance signal Yf' having frequency-deviations between the frequency Fs' and the frequency Fp', the down-converted chrominance signal Cc' having the subcarrier frequency Fc' and allocated a frequency band lower than the frequency band of the FM luminance signal Yf' which is higher than that of the FM luminance signal Yf, and the second FM audio signal Af' having the center frequency Fa' and allocated in a relatively narrow space between the frequency band of the down-converted chrominance signal Cc' which is higher than that of the down-converted chrominance signal Cc and the frequency band of the FM luminance signal Yf'.

The second audio signal AU2 from the audio signal input terminal 15 is further supplied to the PCM audio signal producing circuit 37. In the PCM audio signal producing circuit 37, the second audio signal AU2 is subjected to analog to digital conversion (A/D conversion), coding with error correcting code added thereto, time-base compression and modulation to produce a second PCM audio signal Pa' as a digital audio signal formed based on the second audio signal AU2.

Further, the second code data D2 which are formed, in response to the aspect ratio indicating signal Ss having the high level, to contain the second identifying code data which indicates the second condition in which the second luminance signal Y2 and the second chrominance signal C2 constituting the video signal of 9:16 aspect ratio are supplied to the video signal input terminals 11 and 13, respectively, and therefore the FM luminance signal Yf' and the down-converted chrominance signal Cc' constituting the second recording video signal are obtained from the HPF 21 and the switch 31, respectively, is derived from the code data generator 18.

The second composite recording signal Sm' obtained from the signal mixing circuit 23 is supplied to both of the selective contact 41c of the switch 41 and the selective contact 43c of the switch 43, the second code data D2 obtained from the code data generator 18 is supplied to both of the selective contact 41b of the switch 41 and a selective contact 43b of the switch 43, and the second PCM audio signal Pa' obtained from the PCM audio signal producing circuit 37 is supplied to both of the selective contact 41a of the switch 41 and the selective contact 43a of the switch 43. The switch 41 is controlled in operation by the switch control signals S1 and S2 obtained from the switch control signal generator 45 as described above and the switch 43 is controlled in operation by the switch control signals S3 and S4 obtained from the switch control signal generator 45 as described above. The switch control signal generator 45 is operative to send out the switch control signals S1 to S4 in synchronism with a vertical synchronous signal SYv which is separated from the second luminance signal Y2 and supplied to the terminal 46 provided to the switch control signal generator 45.

With the control by each of the switch control signals S1 and S2, the switch 41 extracts, through the movable contact 41d, the second PCM audio signal Pa' during the period of time Ka close to the end of first every other field period Kf, then the second code data D2 during the short period of time Kb immediately before the end of the first every other field period Kf, and thereafter the second composite recording signal Sm' during second every other field period Kf following the first every other field period Kf, as shown in FIG. 5E, and the switch 43 extracts, through the movable contact 43d, the second PCM audio signal Pa' during the period of time Ka close to the end of the second every other field period Kf, then the second code data D2 during the short period of time Kb immediately before the end of the second every other field period Kf, and thereafter the second composite recording signal Sm' during the second every other field period Kf following the second every other field period Kf, as shown in FIG. 5F. The period of time Kb is selected to correspond to, for example, 6×H, and the code data generator 18 supplies the each of the switches 41 and 43 with the second code data D2 corresponding to, for example, 1.5×H in the aggregate during each of the periods of time Kb.

The second PCM audio signal Pa', the second code data D2 and the second composite recording signal Sm' obtained successively and repeatedly from the switch 41 is supplied through the recording amplifier 47a to the rotary magnetic head 49a, and the second PCM audio signal Pa', the second code data D2 and the second composite recording signal Sm' obtained successively and repeatedly from the switch 43 is supplied through the recording amplifier 47b to the rotary magnetic head 49b.

As shown in FIG. 6, the rotary magnetic heads 49a and 49b which are disposed at the angular interval of 180 degrees are rotated in the direction of the arrow R to scan alternately the magnetic tape T which is wrapped on the surface of the rotary head cylinder HS over the angular extent $\theta_1$ selected to be, for example, 221 degrees to move along the surface of the rotary head cylinder HS.

In each scanning by each of the rotary magnetic heads 49a and 49b, the second PCM audio signal Pa' is recorded on the magnetic tape T during the first period of time in which the rotary magnetic head 49a or 49b comes into contact with the magnetic tape T in the angular extent $\theta_2$ corresponding to the aforementioned period of time Ka at the beginning of its scanning on the magnetic tape T, then the second code data D2 are recorded on the magnetic tape T during the second period of time in which the rotary magnetic head 49a or 49b comes into contact with the magnetic tape T in then angular extent $\theta_3$ following the angular extent $\theta_2$ and corresponding to the aforementioned period of time Kb, and thereafter the second composite recording signal Sm' is recorded on the magnetic tape T during the third period of time in which the rotary magnetic head 49a or 49b comes into contact with the magnetic tape T in the angular extent $\theta_4$ corresponding to the aforementioned field period Kf. As a result, the record tracks Ta formed by the rotary magnetic head 49a and the record tracks Tb formed by the rotary magnetic head 49b are alternately arranged on the magnetic tape T, as shown in FIG. 7. Each of the record tracks Ta and Tb has the portion t1 which extends from the beginning end thereof to correspond to the angular extent $\theta_2$ and in which the second PCM audio signal Pa' is recorded, the portion t2 which follows the portion t1 to correspond to the angular extent $\theta_3$ and in which the second code data D2 are recorded, and the portion t3 which follows the portion t2 to correspond to the angular extent $\theta_4$ and in which the second composite recording signal Sm' is recorded. Consequently, in each of the record tracks Ta and Tb, a unit period segment of the second composite recording signal Sm' which includes a field period segment of the second recording video signal and a segment of the second FM audio signal Af corresponding to the field period segment of the second recording video signal, a segment of the second PCM audio signal Pa' which corresponds to the unit period segment of the second composite recording signal Sm', and the second code data D2 constituting a unit of the video-markers as shown in FIG. 3 are recorded in the portions t1, t2 and t3, respectively.

Figure 9:
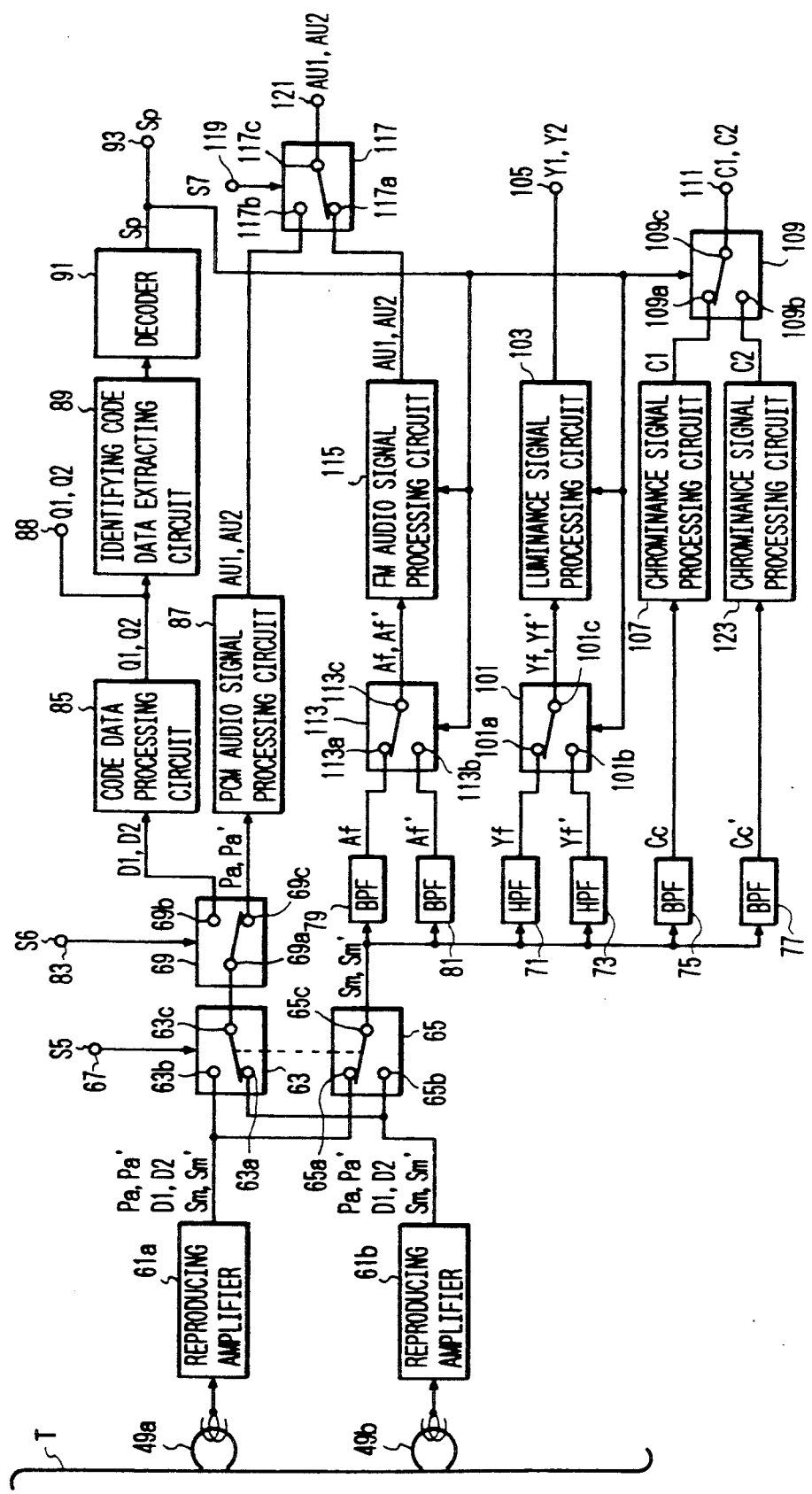
FIG. 9 is a schematic block diagram showing a reproducing system used for reproducing signals recorded on a magnetic tape by the embodiment shown in FIG. 2.

FIG. 9 shows an example of a reproducing system used for reproducing the first luminance signal Y1 and the first chrominance signal C1 which constitute the video signal of 3:4 aspect ratio and the first audio signal AU1 or the second luminance signal Y2 and the second chrominance signal C2 which constitute the video signal of 9:16 aspect ratio and the second audio signal AU2 from the magnetic tape T on which a group of the first composite recording signal Sm, the first PCM audio signal Pa and the first code data D1 or a group of the second composite recording signal Sm', the second PCM audio signal Pa' and the second code data D2 is recorded by the embodiment of apparatus for recording video and audio signals according to the present invention shown in FIG. 2.

Referring to FIG. 9, the rotary magnetic heads 49a and 49b which are employed in the embodiment shown in FIG. 2 are also used as reproducing heads for scanning alternately slant record tracks formed in arrangement on the magnetic tape T. With the rotary magnetic heads 49a and 49b, the field period segment of the first composite recording signal Sm, the segment of the first PCM audio signal Pa which corresponds to the field period segment of the first composite recording signal Sm, and the first code data D1 or the field period segment of the second composite recording signal Sm', the segment of the second PCM audio signal Pa' which corresponds to the field period segment of the second composite recording signal Sm', and the second code data D2 are read from each of the record tracks on the magnetic tape T.

From the rotary magnetic head 49a, the first composite recording signal Sm or the second composite recording signal Sm' is obtained during a first every other period of time Kf' which corresponds to the field period of the first or second recording video signal, and the first PCM audio signal Pa and the first code data D1 or the second PCM audio signal Pa' and the second code data D2 are obtained during a period of time close to the end of a second every other period of time Kf' which corresponds to the field period of the first or second recording video signal and follows the first every other period of time Kf', as shown in FIG. 10A. The first composite recording signal Sm, the first PCM audio signal Pa and the first code data D1 or the second composite recording signal Sm', the second PCM audio signal Pa' and the second code data D2 obtained from the rotary magnetic head 49a are supplied through a reproducing amplifier 61a to a selective contact 63b of a switch 63 and a selective contact 65a of a switch 65.

Further, from the rotary magnetic head 49b, the first composite recording signal Sm or the second composite recording signal Sm' is obtained during the second every other period of time Kf', and the first PCM audio signal Pa and the first code data D1 or the second PCM audio signal Pa' and the second code data D2 are obtained during a period of time close to the end of the first every other period of time Kf' following the second every other period of time Kf', as shown in FIG. 10B. The first composite recording signal Sm, the first PCM audio signal Pa and the first code data D1 or the second composite recording signal Sm', the second PCM audio signal Pa' and the second code data D2 obtained from the rotary magnetic head 49b are supplied through a reproducing amplifier 61b to a selective contact 63a of the switch 63 and a selective contact 65b of the switch 65.

The switches 63 and 65 are controlled by a switch control signal S5 supplied thereto through a terminal 67 to operate in synchronism with each other. The switch control signal S5 has a high level during the first every other period of time Kf' in which the first composite recording signal Sm or the second composite recording signal Sm' is obtained from the rotary magnetic head 49a and the first PCM audio signal Pa and the first code data D1 or the second PCM audio signal Pa' and the second code data D2 are obtained from the rotary magnetic head 49b, and a low level during the second every other period of time Kf' in which the first composite recording signal Sm or the second composite recording signal Sm' is obtained from the rotary magnetic head 49b and the first PCM audio signal Pa and the first code data D1 or the second PCM audio signal Pa' and the second code data D2 are obtained from the rotary magnetic head 49a, as shown in FIG. 10C. A movable contact 63c of the switch 63 engages the selective contact 63a of the switch 63 and a movable contact 65c of the switch 65 engages the selective contact 65a of the switch 65 when the switch control signal S5 has the high level, and the movable contact 63c of the switch 63 engages the selective contact 63b of the switch 63 and the movable contact 65c of the switch 65 engages the selective contact 65b of the switch 65 when the switch control signal S5 has the low level.

With such operations of the switches 63 and 65, the first PCM audio signal Pa and the first code data D1 or the second PCM audio signal Pa' and the second code data D2 obtained from the rotary magnetic head 49a and the first PCM audio signal Pa and the first code data D1 or the second PCM audio signal Pa' and the second code data D2 obtained from the rotary magnetic head 49b are alternately derived from the switch 63 to be supplied to a movable contact 69a of a switch 69, and the first composite recording signal Sm or the second composite recording signal Sm' obtained from the rotary magnetic head 49a and the first composite recording signal Sm or the second composite recording signal Sm' obtained from the rotary magnetic head 49b is alternately derived from the switch 65 to be supplied to an HPF 71 provided for the FM luminance signal Yf, an HPF 73 provided for the FM luminance signal Yf', a BPF 75 provided for the down-converted chrominance signal Cc, a BPF 77 provided for the down-converted chrominance signal Cc', a BPF 79 provided for the first FM audio signal Af and a BPF 81 provided for the second FM audio signal Af'.

The switch 69 is controlled by a switch control signal S6 supplied thereto through a terminal 83. The switch control signal S6 has a low level during a period of time Kb' in which the first code data D1 or the second code data D2 are obtained from the rotary magnetic head 49a or 49b and which follows a period of time Ka' in which the first PCM audio signal Pa or the second PCM audio signal Pa' from the rotary magnetic head 49a or 49b, and a high level during the remaining periods of time, as shown in FIG. 10D. The movable contact 69a of the switch 69 engages a selective contact 69b when the switch control signal S6 has the low level and engages a selective contact 69c when the switch control signal S6 has the high level. Therefore, the first code data D1 or the second code data D2 obtained from the rotary magnetic head 49a or 49b are supplied through the movable contact 69a and the selective contact 69b of the switch 69 to a code data processing circuit 85, and the first PCM audio signal Pa or the second PCM audio signal Pa' obtained from the rotary magnetic head 49a or 49b is supplied through the movable contact 69a and the selective contact 69c of the switch 69 to a PCM audio signal processing circuit 87.

From the code data processing circuit 85, a reproduced output Q1 or Q2 containing data words W0 to W4 of the first code data D1 or the second code data D2 is obtained. The reproduced output Q1 or Q2 appears at an output terminal 88 and is supplied to an identifying code data extracting circuit 89. In the identifying code data extracting circuit 89, reproduced outputs of the identifying code data are extracted from the reproduced output Q1 or Q2 to be supplied to a decoder 91. It is checked whether the reproduced outputs of the identifying code data are based on the first code data D1 or the second code data D2 in the decoder 91 and an aspect ratio detection output signal Sp which has a low level when the reproduced outputs of the identifying code data are based on the first code data D1 and a high level when the reproduced outputs of the identifying code data are based on the second code data D2 is derived from the decoder 91 to an output terminal 93.

Under such a condition, the aspect ratio detection output signal Sp having the low level is obtained from the decoder 91 when the first composite recording signal Sm, the first PCM audio signal Pa and the first code data D1 are read from the magnetic tape T by the rotary magnetic heads 49a and 49b. Then, the FM luminance signal Yf is obtained through the HPF 71 and supplied to a selective contact 101a of a switch 101. The switch 101 is supplied with the aspect ratio detection output signal Sp from the decoder 91 and operative to cause a movable contact 101c thereof to engage the selective contact 101a in response to the aspect ratio detection output signal Sp having the low level, so that the FM luminance signal Yf from the HPF 71 is supplied through the switch 101 to a luminance signal processing circuit 103. The luminance signal processing circuit 103 is also supplied with the aspect ratio detection output signal Sp from the decoder 91 and operative to cause the FM luminance signal Yf to be subjected to various treatments including frequency-demodulation in response to the aspect ratio detection output signal Sp having the low level, so that the first luminance signal Y1 is produced based on the FM luminance signal Yf in the luminance signal processing circuit 103 and forwarded to a luminance signal output terminal 105 as a reproduced luminance signal.

The down-converted chrominance signal Cc is obtained from the BPF 75 and supplied to a chrominance signal processing circuit 107. In the chrominance signal processing circuit 107, the down-converted chrominance signal Cc is subjected to various treatments including frequency-conversion, so that the first chrominance signal C1 is produced based on the down-converted chrominance signal Cc and forwarded to a selective contact 109a of a switch 109. The switch 109 is supplied with the aspect ratio detection output signal Sp from the decoder 91 and operative to cause a movable contact 109c thereof to engage the selective contact 109a in response to the aspect ratio detection output signal Sp having the low level, so that the first chrominance signal C1 from the chrominance signal processing circuit 107 is forwarded through the switch 109 to a chrominance signal output terminal 111 as a reproduced chrominance signal.

The first FM audio signal Af is obtained through the BPF 79 and supplied to a selective contact 113a of a switch 113. The switch 113 is supplied with the aspect ratio detection output signal Sp from the decoder 91 and operative to cause a movable contact 113c thereof to engage the selective contact 113a in response to the aspect ratio detection output signal Sp having the low level, so that the first FM audio signal Af from the BPF 79 is supplied through the switch 113 to a FM audio signal processing circuit 115. The FM audio signal processing circuit 115 is also supplied with the aspect ratio detection output signal Sp from the decoder 91 and operative to cause the first FM audio signal Af to be subjected to various treatments including frequency-demodulation in response to the aspect ratio detection output signal Sp having the low level, so that the first audio signal AU1 is produced based on the first FM audio signal Af in the FM audio signal processing circuit 115 and forwarded to a selective contact 117a of a switch 117.

Further, the first PCM audio signal Pa from the switch 69 is supplied to a PCM audio signal processing circuit 87. In the PCM audio signal processing circuit 87, the first PCM audio signal Pa is subjected to demodulation, time-base expansion, code error correction, digital to analog conversion and so on, so that the first audio signal AU1 is produced based on the first PCM audio signal Pa in the PCM audio signal processing circuit 87 and forwarded to a selective contact 117b of the switch 117.

The switch 117 is supplied with a switch control signal S7 supplied through a terminal 119 and operative to cause a movable contact 117c thereof to engage the selective contact 117a or 117b in response to the switch control signal S7, so that the first audio signal AU1 from the FM audio signal processing circuit 115 or the first audio signal AU1 from the PCM audio signal processing circuit 87 is selected to be forwarded to an audio signal output terminal 121 as a reproduced audio signal.

On the other hand, the aspect ratio detection output signal Sp having the high level is obtained from the decoder 91 when the second composite recording signal Sm', the second PCM audio signal Pa' and the second code data D2 are read from the magnetic tape T by the rotary magnetic heads 49a and 49b. Then, the FM luminance signal Yf' is obtained through the HPF 73 and supplied to a selective contact 101b of the switch 101. The switch 101 is operative to cause the movable contact 101c thereof to engage the selective contact 101b in response to the aspect ratio detection output signal Sp having the high level, so that the FM luminance signal Yf' from the HPF 73 is supplied through the switch 101 to the luminance signal processing circuit 103. The luminance signal processing circuit 103 is operative to cause the FM luminance signal Yf' to be subjected to various treatments including frequency-demodulation in response to the aspect ratio detection output signal Sp having the high level, so that the second luminance signal Y2 is produced based on the FM luminance signal Yf' in the luminance signal processing circuit 103 and forwarded to the luminance signal output terminal 105 as a reproduced luminance signal.

The down-converted chrominance signal Cc' is obtained from the BPF 77 and supplied to a chrominance signal processing circuit 123. In the chrominance signal processing circuit 123, the down-converted chrominance signal Cc' is subjected to various treatments including frequency-conversion, so that the second chrominance signal C2 is produced based on the down-converted chrominance signal Cc' and forwarded to a selective contact 109b of the switch 109. The switch 109 is operative to cause the movable contact 109c thereof to engage the selective contact 109b in response to the aspect ratio detection output signal Sp having the high level, so that the second chrominance signal C2 from the chrominance signal processing circuit 123 is forwarded through the switch 109 to the chrominance signal output terminal 111 as a reproduced chrominance signal.

The second FM audio signal Af' is obtained through the HPF 81 and supplied to a selective contact 113b of the switch 113. The switch 113 is operative to cause the movable contact 113c thereof to engage the selective contact 113b in response to the aspect ratio detection output signal Sp having the high level, so that the second FM audio signal Af' from the BPF 81 is supplied through the switch 113 to the FM audio signal processing circuit 115. The FM audio signal processing circuit 115 is operative to cause the second FM audio signal Af' to be subjected to various treatments including frequency-demodulation in response to the aspect ratio detection output signal Sp having the high level, so that the second audio signal AU2 is produced based on the second FM audio signal Af' in the FM audio signal processing circuit 115 and forwarded to a selective contact 117b of the switch 117.

Further, the second PCM audio signal Pa' from the switch 69 is supplied to the PCM audio signal processing circuit 87. In the PCM audio signal processing circuit 87, the second PCM audio signal Pa' is subjected to demodulation, time-base expansion, code error correction, digital to analog conversion and so on, so that the second audio signal AU2 is produced based on the second PCM audio signal Pa' in the PCM audio signal processing circuit 87 and forwarded to the selective contact 117b of the switch 117.

The switch 117 is operative to cause the movable contact 117c thereof to engage the selective contact 117a or 117b in response to the switch control signal S7, so that the second audio signal AU2 from the FM audio signal processing circuit 115 or the second audio signal AU2 from the PCM audio signal processing circuit 87 is selected to be forwarded to the audio signal output terminal 121 as a reproduced audio signal.

Although, in the embodiment shown in FIG. 2, the first code data D1 or the second code data D2 are recorded in each record track formed on the magnetic tape, it is not always required to record the first code data D1 or the second code data D2 in each record track formed on the magnetic tape. Further, although, in the embodiment shown in FIG. 2, the first code data D1 or the second code data D2 are recorded in the V-P guard allocated between the portions of the record track in which the first composite recording signal Sm and the first PCM audio signal Pa or the second composite recording signal Sm' and the second PCM audio signal Pa' are recorded, respectively, a portion of the record track in which the first code data D1 or the second code data D2 is not limited to the V-P guard but can be selected to be any other portion of the record track by which the first composite recording signal Sm and the first PCM audio signal Pa or the second composite recording signal Sm' and the second PCM audio signal Pa' recorded on the magnetic tape are not affected adversely.

What is claimed is:

1. An apparatus for recording video and audio signals, the apparatus comprising:
    input means for receiving either a first input video signal that represents a picture having a first aspect ratio and a first input audio signal associated with said first input video signal or a second input video signal that represents a picture having a second aspect ratio and a second input audio signal associated with said second input video signal, and for receiving an aspect ratio indicating signal which indicates whether said first video and audio input signal or said second video and audio input signals are being received;
    recording video signal producing means connected to said input means for processing the received input video signal and for generating selectively, under control of said received aspect ratio indicating signal, either a first recording video signal based on said first input video signal when the latter is received or a second recording video signal based on said second input video signal when said second input video signal is received, digital audio signal producing means connected to said input means for processing the received input audio signal and for generating a digital audio signal based on said received first or second audio signal, code data reproducing means connected to said input means for generating, in accordance with said received aspect ratio indicating signal, code data indicating whether said first recording video signal or said second recording video signal is being generated by the recording video signal producing means, magnetic head means operative to scan a magnetic recording medium for forming a plurality of record tracks arranged successively on the magnetic recording medium, and signal supply means connected to said recording video signal producing means, said digital signal producing means and said code data producing means for supplying the magnetic head means with said first or second recording video signal, said digital audio signal and said code data in such a manner that a unit period segment of said first or second recording video signal, a segment of said digital audio signal corresponding to said unit period segment and said code data are recorded in respective different portions of each of said record tracks.

2. An apparatus according to claim 1, wherein said first input video signal comprises a first input luminance signal and a first input chrominance signal and said second input video signal comprises a second input luminance signal and a second input chrominance signal; said input means comprises means for receiving said input luminance signals and means for receiving said input chrominance signals; said recording video signal producing means comprises means for processing said received input luminance signal and for producing selectively under control of said received aspect ratio indicating signal either a first frequency-modulated luminance signal based on said received first input luminance signal or a second frequency-modulated luminance signal based on said received second input luminance signal, means for processing said received input chrominance signal and for producing selectively under control of said received aspect ratio indicating signal either a first down-converted chrominance signal based on said received first input chrominance signal or a second down-converted chrominance signal based on said received second input chrominance signal, and combining means for combining either the first frequency-modulated luminance signal with the first down-converted chrominance signal to generate the first recording video signal or the second frequency-modulated luminance signal with the second down-converted chrominance signal to generate the second recording video signal.

3. An apparatus according to claim 2, wherein said recording video signal producing means further comprises means for processing said received input audio signal and for producing selectively under control of said received aspect ratio indicating signal either a first frequency-modulated audio signal based on said received first input audio signal or a second frequency-modulated audio signal based on said received second input audio signal, and said combining means is operative to combine the first frequency-modulated audio signal with the first frequency-modulated luminance signal and the first down-converted chrominance signal to generate the first recording video signal or to combine the second frequency-modulated audio signal with the second frequency-modulated luminance signal and the second down-converted chrominance signal to generate the second recording video signal.

4. An apparatus according to claim 1, wherein said digital audio signal producing means comprises means for processing said received input audio signal in accordance with pulse code modulation.

5. An apparatus according to claim 1, wherein said first aspect ratio is 3:4 and said second aspect ratio is 9:16.

6. An apparatus according to claim 1, wherein said signal supply means comprises means for causing the unit period segment of the first recording video signal to correspond to a field period segment of the first input video signal and causing the unit period segment of the second recording video signal to correspond to a field period segment of the second input video signal.

7. An apparatus according to claim 6, wherein said signal supply means is operative to supply the magnetic head means with the first or second recording video signal, the digital audio signal and the code data in such a manner that the code data are recorded in a portion of the record track allocated between portions of the record track in which the unit period segment of the first or second recording video signal and the segment of the digital audio signal are recorded, respectively.

* * * * *